(12) United States Patent
Breu et al.

(10) Patent No.: US 12,187,163 B2
(45) Date of Patent: Jan. 7, 2025

(54) HIGH-VOLTAGE SYSTEM FOR A FUEL-CELL VEHICLE FOR DETERMINING AN INSULATION FAULT

(71) Applicant: AUDI AG, Ingolstadt (DE)

(72) Inventors: Martin Breu, Münster/Steinach (DE); Maximilian Schiedermeier, Ingolstadt (DE); Jessica Denisse Ramirez Rocha, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 1127 days.

(21) Appl. No.: 17/045,711

(22) PCT Filed: Mar. 11, 2019

(86) PCT No.: PCT/EP2019/055977
§ 371 (c)(1),
(2) Date: Oct. 6, 2020

(87) PCT Pub. No.: WO2019/192802
PCT Pub. Date: Oct. 10, 2019

(65) Prior Publication Data
US 2021/0362624 A1    Nov. 25, 2021

(30) Foreign Application Priority Data

Apr. 6, 2018  (DE) .............. 10 2018 205 165.8

(51) Int. Cl.
*B60L 58/40* (2019.01)
*B60L 3/00* (2019.01)
*B60L 58/30* (2019.01)
*H01M 8/04664* (2016.01)

(52) U.S. Cl.
CPC ............. *B60L 58/40* (2019.02); *B60L 3/0053* (2013.01); *B60L 58/30* (2019.02); *H01M 8/04664* (2013.01); *B60L 2210/10* (2013.01); *B60L 2210/40* (2013.01); *H01M 2220/20* (2013.01); *H01M 2250/20* (2013.01)

(58) Field of Classification Search
None
See application file for complete search history.

(56) References Cited

FOREIGN PATENT DOCUMENTS

| | | |
|---|---|---|
| DE | 102 12 493 A1 | 10/2003 |
| DE | 11 2008 002 750 T5 | 8/2010 |
| DE | 10 2014 103 117 A1 | 9/2014 |
| DE | 10 2016 009 346 A1 | 2/2017 |
| DE | 10 2016 005 732 A1 | 11/2017 |
| DE | 10 2017 010 390 A1 | 5/2018 |
| JP | 2003-250201 A | 9/2003 |
| JP | 2010004631 A * | 1/2010 |
| JP | 5207843 B2 | 6/2013 |

OTHER PUBLICATIONS

Machine translation of JP 2010-004631 A (Kayano) (Year: 2010).*

* cited by examiner

*Primary Examiner* — Wyatt P McConnell
(74) *Attorney, Agent, or Firm* — Seed IP Law Group LLP

(57) ABSTRACT

A high-voltage system of a fuel cell vehicle and a method for operating said system are described herein.

10 Claims, 2 Drawing Sheets

HIGH-VOLTAGE SYSTEM FOR A FUEL-CELL VEHICLE FOR DETERMINING AN INSULATION FAULT

BACKGROUND

Technical Field

Embodiments of the invention relate to a high-voltage (HV) system of a fuel-cell vehicle and to a method for operating the HV system.

Description of the Related Art

The HV systems of electric and hybrid vehicles often have a rated voltage of several hundred volts—for example, 350 to 400 volts. Safety measures are therefore necessary in order to prevent the high voltage from endangering human life and vehicle components. Due to insulation faults, uncontrolled fault currents can develop which are strong enough to endanger human life, start fires, or cause other damage to property. In vehicles, the insulation resistance of the HV system (high-voltage system) is therefore monitored periodically or continuously.

Various vehicle manufacturers have agreed on a standard (LV123) for the safety of high-voltage technology in electric and hybrid vehicles. This refers to the ISO 6497-3 standard, which specifies a threshold for insulation resistance, which must absolutely be observed. An insulation monitor regularly or continuously checks the insulation resistance between the HV circuit and the vehicle ground. If this falls below the predefined threshold value, fault messages will be generated, and system components may be switched off.

Fuel-cell vehicles have two high-voltage networks (HV networks), the fuel-cell network (fuel-cell high-voltage circuit), and the traction network, which are coupled via a DC/DC converter. The two HV networks must be regularly monitored. The traction network usually has an insulation monitor, which is normally located in the HV battery. Since there is a blocking diode present in the DC/DC converter, the insulation monitor cannot, however, measure through the converter into the fuel-cell high-voltage circuit. For this reason, a second insulation monitor is necessary in the fuel-cell high-voltage circuit.

This gives rise to a number of disadvantages. To prevent insulation faults, the two insulation monitors must not measure simultaneously. The measurement ranges of the insulation monitors must be tuned. This requires a functional outlay and leads to limitations in the design of the fuel cell. The result is doubled component costs, larger installation space, and additional coordination effort is required.

BRIEF SUMMARY

An object of some embodiments of the invention is to provide an HV system and a method which at least partially eliminate the disadvantages described. In particular, a simple and cost-effective inspection of the HV system for insulation faults is to be made possible.

DE 10 2016 009 346 A1 relates to a circuit arrangement for a motor vehicle, comprising: a fuel-cell stack, a high-voltage battery, an electronic energy converter through which the fuel-cell stack is electrically coupled to the high-voltage battery using a common potential connection, an insulation monitoring device configured to monitor an insulation resistance between the circuit arrangement and a ground potential electrically insulated from it during operation, and a coolant circuit for cooling the fuel-cell stack. The coolant circuit is electrically coupled to the common potential connection, wherein the insulation monitoring device is connected between the common potential connection and the ground potential. To improve the measuring accuracy of an insulation resistance in a high-voltage network comprising the circuit arrangement, it is proposed to place the coolant circuit on the common potential connection and to place the insulation monitoring device on the common potential connection.

DE 10 2014 103 117 A1 discloses a method for monitoring the insulation resistance in a vehicle propulsion system, wherein the method comprises: circulating a coolant in a coolant system fluidically coupled to a fuel-cell stack forming at least a portion of the vehicle propulsion system, wherein the coolant provides a thermal management within the fuel-cell stack, and wherein the coolant provides an electrical insulation between the fuel-cell stack and a vehicle chassis; closing at least one contactor in an electrical system comprising a stack voltage and a battery voltage; measuring a first insulation value, a second insulation value, the stack voltage, and the battery voltage. The method further comprises opening the at least one contactor with the electrical system; measuring a first negative insulation value; calculating a stack insulation resistance using the first insulation value, the second insulation value, the first negative insulation value, the stack voltage, and the battery voltage; calculating a coolant conductivity value; and, when the coolant conductivity value crosses a threshold value, indicating that the coolant in the coolant system needs to be replaced.

According to some embodiments of the invention, the two, normally present insulation monitors are replaced by a single insulation monitor tuned for both HV networks. This insulation monitor is arranged in the FC high-voltage circuit. This insulation monitor can also measure the insulation resistance through the blocking diode in the DC/DC converter in order to check the traction network and the fuel-cell network for a common insulation fault. This is possible because the measurement can be carried out in the conducting direction of the blocking diode.

The subject-matter of some embodiments of the invention is a high-voltage system (HV system) for a fuel-cell vehicle, comprising a fuel-cell network with a fuel-cell system and a traction network with a high-voltage battery (HV battery). The fuel-cell network and the traction network are electrically connected to each other via a DC/DC converter. The DC/DC converter includes a blocking diode having a conducting direction from the fuel-cell network towards the traction network. According to some embodiments of the invention, the HV system comprises only a single insulation monitor, which is associated with the fuel-cell network. The insulation monitor is configured to detect an insulation fault common to the fuel-cell network and the traction network.

The HV system is used to operate at least one electrical consumer of the motor vehicle. The HV system may be used to operate a drive device of the motor vehicle, which has at least one drive unit taking the form of an electrical machine. The drive unit can be supplied with electric current via the HV system.

The drive device or the drive unit is used to drive the motor vehicle, i.e., to provide a drive torque. The drive device can of course also be configured as a hybrid drive device, which has at least one additional drive unit in addition to the drive unit. The drive unit and the additional drive unit may be of different types; for example, the additional drive unit may take the form of an internal combustion engine. In the case of a hybrid drive device, the drive unit and the additional drive unit may at least sometimes provide the drive torque jointly.

The fuel-cell network and the traction network are connected to each other via the DC/DC converter. The fuel-cell network and the traction network may be at least intermittently operated at different voltage levels, such that a first voltage level is present in the fuel-cell network, and a second voltage level different from the first voltage level is present in the traction network.

The DC/DC converter is used for transmitting electrical energy from the fuel-cell network into the traction network. By means of the fuel-cell system, electrical energy can be provided in the fuel-cell network and transmitted to the traction network via the DC/DC converter.

The DC/DC converter contains a blocking diode via which the fuel-cell network and the traction network are at least intermittently electrically connected to one another. In other words, the fuel-cell network is connected to the traction network via the blocking diode of the DC/DC converter. The DC/DC converter may be embodied as a charge pump or boost converter.

A further embodiment of the invention envisages the fuel-cell network having a first connection and a second connection and the traction network having a first connection and a second connection, wherein the first connection of the fuel-cell network and the first connection of the traction network are connected to each other via the blocking diode, and the second connection of the fuel-cell network and the second connection of the traction network are directly connected to each other. The second fuel-cell network connection and the second traction network connection are directly, such as permanently, electrically connected to each other and, in particular, are connected to the electrical ground—such as, likewise permanently. The second connection of the fuel-cell network and the second connection of the traction network are thus at the same electrical potential. The first fuel-cell network connection and the first traction network connection, on the other hand, are only indirectly connected to each other via the blocking diode.

In one embodiment of the DC/DC converter, between the first connection of the fuel-cell network and the first connection of the traction network, a circuit-breaker is electrically connected in series with the blocking diode. In a further embodiment, an inductor is connected in series with the blocking diode. The inductor is used to temporarily store electrical energy taken up from the fuel-cell network at a first voltage. The circuit-breaker is set in such a way that the electrical energy temporarily stored in the inductor is supplied to the traction network at a second voltage. This results in a particularly cost-effective implementation of the DC/DC converter, which also makes it possible to check the HV system for the insulation fault common to the fuel-cell network and the traction network by means of a single insulation monitor.

An insulation monitor is assigned to the fuel-cell network and is provided for detecting the insulation fault common to the fuel-cell network and the traction network. In one embodiment, the insulation monitor has a measuring resistor. In order to check for the presence of the insulation fault, the insulation monitor connects an electrical pole of the fuel-cell network to a second pole—such as an electrical ground—via the measuring resistor. In other words, the pole of the fuel-cell network is electrically connected to a body of the motor vehicle via the measuring resistor. The insulation monitor applies a test voltage to the fuel-cell network and thus to the entire HV system. The insulation monitor may apply the test voltage periodically to the HV system. In one embodiment, the test voltage is a square-wave voltage.

The amperage of the electric current flowing through the measuring resistor is determined during the application of the test voltage to the HV system. If the amperage deviates from an expected amperage or if there is a greater voltage drop at the measuring resistor than expected, the presence of an insulation fault is detected.

In this case, suitable countermeasures are initiated, in particular by the insulation monitor; for example, a fault message is displayed and/or a fault entry is written to a fault memory.

With such a development of the HV system, the insulation monitor can then be used to detect the insulation fault common to the fuel-cell network and the traction network. In this respect, a second insulation monitor, associated with the traction network and used for determining an insulation fault therein, becomes superfluous. Instead, it is sufficient to check for the presence of the insulation fault common to the two power-supply networks by means of the insulation monitor. This enables a cost-effective development of the HV system.

In one embodiment, the insulation monitor is a component of the fuel-cell system. Checking for the insulation fault common to the fuel-cell network and the traction network can therefore be implemented with the least possible outlay on hardware.

In one embodiment of the HV system, the insulation monitor is a component of the fuel-cell system. In another embodiment of the HV system, the insulation monitor is a component of the DC/DC converter and is electrically connected to its inputs. In a further embodiment of the HV system, the insulation monitor is arranged between the fuel-cell system and the DC/DC converter.

A further embodiment of the invention provides that at least one consumer is electrically connected to the traction network (the traction circuit). The electrical consumer is, for example, a drive unit—in particular, an electrical machine—which is connected to the traction circuit via a pulse-controlled inverter. In a further embodiment, the at least one consumer comprises an auxiliary unit of the fuel cell, a charger, a 12 V DC/DC converter, an air-conditioning compressor, and/or an HV heater. This arrangement allows the consumer to be operated solely with electrical energy taken from the HV battery. Optionally, the consumer can also be operated with electrical energy from the fuel-cell network, which is provided to the traction network via the DC/DC converter.

The electric current provided by the fuel-cell system can be used for operating the consumer in the traction circuit and/or for charging the HV battery. The fuel cell can help to ensure a reliable and continuous supply of electric current to the onboard electrical system.

Some embodiments of the invention further relate to a method for operating an HV system in accordance with the preceding descriptions. In this case, it is provided that an insulation fault common to the fuel-cell network and the traction network be detected by means of the insulation monitor.

In one embodiment of the method, the insulation monitor detects the insulation fault by periodically applying a test voltage to the fuel-cell network and determining the electric current passing through a measurement resistor. If the amperage deviates from an expected amperage or if there is a greater voltage drop at the measuring resistor than expected, the presence of an insulation fault is detected. In one embodiment of the method, the test voltage is a square-wave voltage.

Among the advantages of the HV system according to some embodiments of the invention is that it has a reduced space requirement and reduced component costs. Furthermore, there is no additional coordination effort for detecting insulation faults. Additional advantages and embodiments of the invention result from the description and the accompanying drawings.

It goes without saying that the features mentioned above and the features yet to be explained below can be used not only in the respectively specified combination, but also in other combinations or alone, without departing from the scope of the present invention.

BRIEF DESCRIPTION OF THE SEVERAL VIEWS OF THE DRAWINGS

Embodiments of the invention are illustrated schematically using embodiments in the drawings and are described schematically and in detail with reference to the drawings.

DETAILED DESCRIPTION

Figure 1:
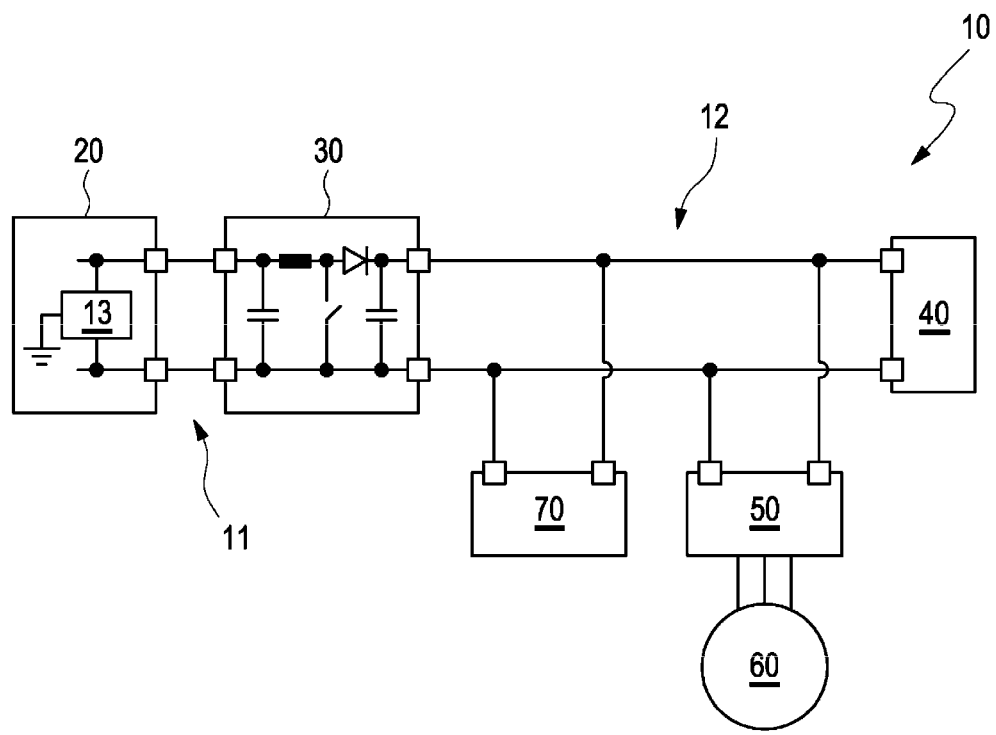
FIG. 1 illustrates a schematic representation of an embodiment of an HV system according to some embodiments of the invention.

FIG. 1 shows schematically an embodiment of an HV system 10 according to some embodiments of the invention. The HV system 10 includes a fuel-cell circuit 11 having a fuel-cell system 20 and a traction circuit 12 having an HV battery 40. Electric motors 60 are connected to the traction circuit 12 via pulse-controlled inverter 50, as well as further HV components 70, e.g., auxiliary units of the fuel cell, chargers, 12 V DC/DC converters, air-conditioning compressors, HV heaters, etc. A DC/DC converter 30 is arranged between fuel-cell circuit 11 and traction circuit 12. The input of DC/DC converter 30 is connected to the poles of fuel-cell system 20, and the output of DC/DC converter 30 is connected to the poles of HV battery 40.

The HV system 10 comprises only a single insulation monitor 13, which is arranged in the fuel-cell circuit 11. The insulation monitor 13 can monitor the insulation resistance in both the fuel-cell circuit 11 and the traction circuit 12 because it can measure through the DC/DC converter 30.

In the variant shown in FIG. 1, the insulation monitor 13 is arranged in the fuel-cell system 20. The insulation resistance can be measured through the blocking diode of the DC/DC converter.

Figure 2:
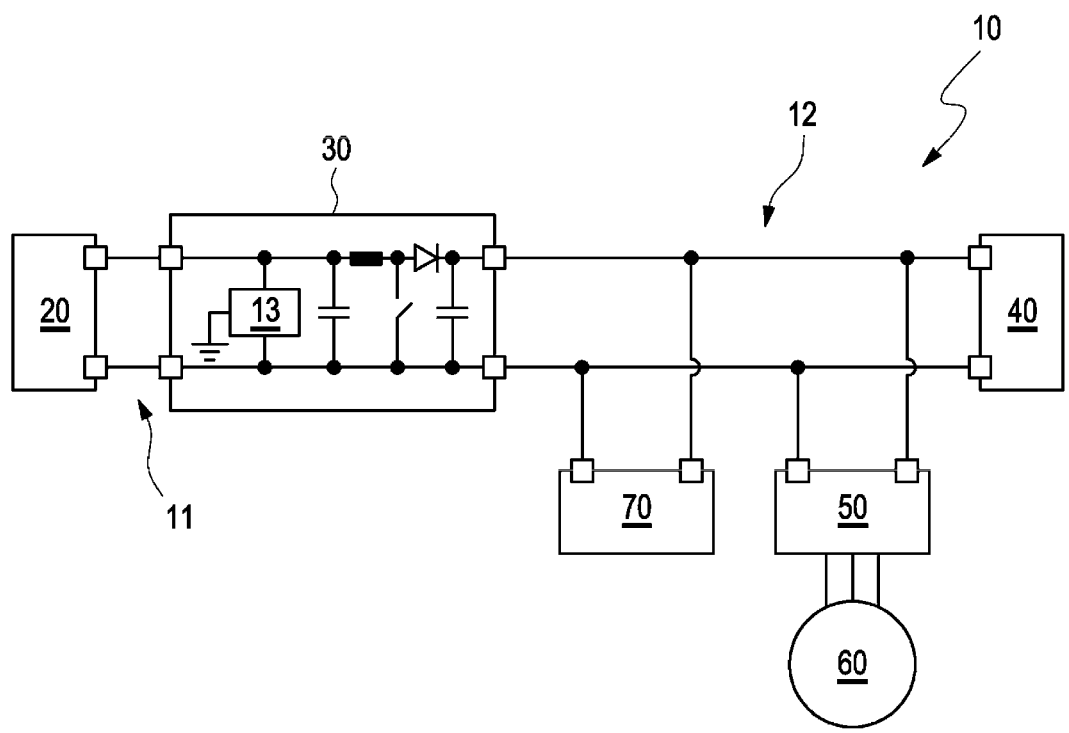
FIG. 2 illustrates a schematic representation of another embodiment of an HV system according to some embodiments of the invention.

FIG. 2 shows a block diagram of another embodiment of an HV system 10 according to some embodiments of the invention. In this variant, the insulation monitor 13 is arranged in the DC/DC converter 30 and connected to its inputs.

Figure 3:
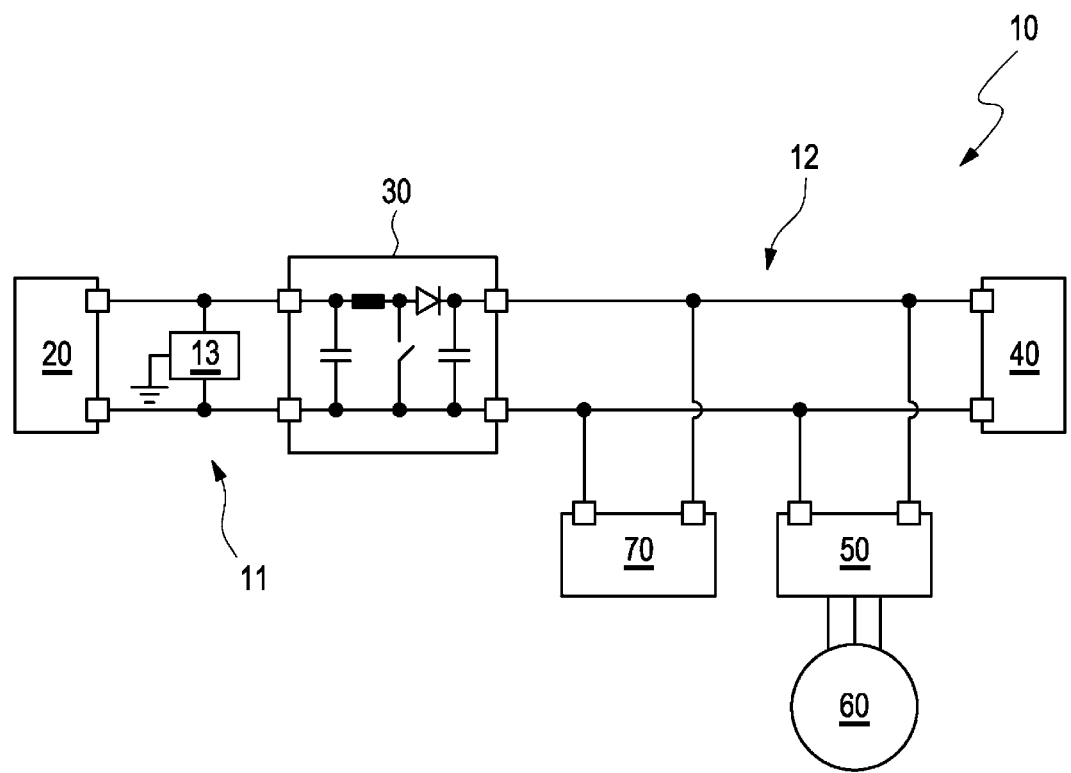
FIG. 3 illustrates a schematic representation of a further embodiment of an HV system according to some embodiments of the invention.

FIG. 3 shows a block diagram of a further embodiment of an HV system 10 according to some embodiments of the invention. In this variant, the insulation monitor 13 is not integrated into the fuel-cell system 20 or the DC/DC converter 30, but is implemented as an independent unit (stand-alone, external box).

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A high-voltage system for a fuel-cell vehicle, comprising:
   a fuel-cell network with a fuel-cell system; and
   a traction network with a high-voltage battery,
   wherein the fuel-cell network and the traction network are electrically connected to each other via a DC/DC converter with a blocking diode having a conducting direction from the fuel-cell network in the direction of the traction network, the blocking diode being an integral part of the DC/DC converter, and
   wherein the high-voltage system comprises a single insulation monitor that is associated with the fuel-cell network and that is set up to detect an insulation fault common to the fuel-cell network and the traction network.

2. The high-voltage system according to claim 1, wherein the insulation monitor is a component of the fuel-cell system.

3. The high-voltage system according to claim 1, wherein the insulation monitor is a component of the DC/DC converter and is electrically connected to inputs of the DC/DC converter.

4. The high-voltage system according to claim 1, wherein the insulation monitor is arranged between the fuel-cell system and the DC/DC converter.

5. The high-voltage system according to claim 1, wherein the insulation monitor comprises a measuring resistor.

6. The high-voltage system according to claim 1, wherein at least one consumer is electrically connected to the traction network.

7. The high-voltage system according to claim 6, wherein the at least one consumer is a pulse-controlled inverter by which an electric machine is supplied with current.

8. The high-voltage system according to claim 6, wherein the at least one consumer is an auxiliary unit of the fuel-cell system, a charger, a 12 V DC/DC converter, an air-conditioning compressor, or an HV heater.

9. A method for operating a high-voltage system for a fuel-cell vehicle, which comprises a fuel-cell network with a fuel-cell system and a traction network with a high-voltage battery, wherein the fuel-cell network and the traction network are electrically connected to each other via a DC/DC converter with a blocking diode having a conducting direction from the fuel-cell network in the direction of the traction network, the blocking diode being an integral part of the DC/DC converter, and wherein the high-voltage system comprises a single insulation monitor that is associated with the fuel-cell network and that is set up to detect an insulation fault common to the fuel-cell network and the traction network, the method comprising:
   detecting an insulation fault common to the fuel-cell network and the traction network by the insulation monitor.

10. The method according to claim 9, wherein the insulation monitor detects the insulation fault common to the fuel-cell network and the traction network by periodically applying a test voltage to the fuel-cell network and determining the electric current flowing through a measuring resistor.

\* \* \* \* \*